(12) United States Patent
Tokmakov et al.

(10) Patent No.: US 12,564,956 B2
(45) Date of Patent: Mar. 3, 2026

(54) ESTIMATING A TRAJECTORY OF AN OBJECT IN AN ENVIRONMENT

(71) Applicants: TOYOTA RESEARCH INSTITUTE, INC., Los Altos, CA (US); THE TRUSTEES OF COLUMBIA UNIVERSITY IN THE CITY OF NEW YORK, New York, NY (US)

(72) Inventors: Pavel Tokmakov, Santa Monica, CA (US); Ishaan Chandratreya, Cambridge, MA (US); Shuran Song, Palo Alto, CA (US); Carl Vondrick, New York, NY (US); Simon Stent, London (GB); Huy Ha, New York, NY (US)

(73) Assignees: TOYOTA RESEARCH INSTITUTE, INC., Los Altos, CA (US); TOYOTA JIDOSHA KABUSHIKI KAISHA, Aichi-Ken (JP); THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 18/434,680

(22) Filed: Feb. 6, 2024

(65) Prior Publication Data
US 2024/0269844 A1 Aug. 15, 2024

Related U.S. Application Data

(60) Provisional application No. 63/445,216, filed on Feb. 13, 2023.

(51) Int. Cl.
| | |
|---|---|
| *B25J 9/16* | (2006.01) |
| *B60W 60/00* | (2020.01) |
| *G06T 7/20* | (2017.01) |

(52) U.S. Cl.
CPC ............... *B25J 9/1664* (2013.01); *G06T 7/20* (2013.01); *B60W 60/001* (2020.02); (Continued)

(58) Field of Classification Search
CPC B25J 9/1664; G06T 7/20; G06T 2207/10028; G06T 2207/20081; (Continued)

(56) References Cited

U.S. PATENT DOCUMENTS

| | | | |
|---|---|---|---|
| 9,381,643 B2 | 7/2016 | Hoffmann et al. | |
| 11,173,599 B2 | 11/2021 | Levine et al. | |
| (Continued) | | | |

FOREIGN PATENT DOCUMENTS

| | | |
|---|---|---|
| CN | 112183221 A | 1/2021 |
| WO | 2022217794 A1 | 10/2022 |

OTHER PUBLICATIONS

Phung et al.; Learning to Catch Moving Objects with Reduced Impulse Exchange, IFAC Proceedings Volumes, vol. 47, Issue 3, 2014, pp. 3036-3041.

(Continued)

*Primary Examiner* — Jay Khandpur
(74) *Attorney, Agent, or Firm* — Seyfarth Shaw LLP

(57) ABSTRACT

A method for interacting with an object includes identifying, via a keypoint classifier, one or more uncertainty regions in an environment based on an estimated trajectory of an object in the environment. The method also includes planning an interaction with the object based on identifying the one or more uncertainty regions, the planned interaction being within a region of the environment that is different from the one or more uncertainty regions. The method further includes interacting with the object based on planning the interaction.

20 Claims, 9 Drawing Sheets

(52) U.S. Cl.
CPC .................. *B60W 2420/403* (2013.01); *G06T 2207/10028* (2013.01); *G06T 2207/20081* (2013.01); *G06T 2207/20084* (2013.01); *G06T 2207/30241* (2013.01)

(58) Field of Classification Search
CPC ........... G06T 2207/20084; G06T 2207/30241; B60W 60/001; B60W 2420/403
See application file for complete search history.

(56) References Cited

U.S. PATENT DOCUMENTS

| | | | | |
|---|---|---|---|---|
| 2017/0315551 | A1* | 11/2017 | Mimura | B60W 30/143 |
| 2020/0193182 | A1* | 6/2020 | Kim | G06V 20/588 |
| 2022/0050469 | A1 | 2/2022 | Rudenko et al. | |
| 2022/0305657 | A1 | 9/2022 | Hong et al. | |
| 2023/0331243 | A1* | 10/2023 | White | B60W 60/0015 |
| 2024/0094009 | A1* | 3/2024 | Bosse | G01C 21/3848 |
| 2024/0198530 | A1* | 6/2024 | Ugalde Diaz | B25J 9/1679 |
| 2024/0239366 | A1* | 7/2024 | Topolovec | G06T 7/73 |

OTHER PUBLICATIONS

Salzmann et al.; Trajectron++: Multi-agent Generative Trajectory Forecasting with Heterogeneous Data for Control; ECCV, Jan. 13, 2021.
Jayaraman et al.; Time-Agnostic Prediction: Predicting Predictable Video Frames; ICLR; arXiv:1808.07784v3, Oct. 23, 2018.
Sekar et al.; Planning to Explore via Self-Supervised World Models; ICLR; arXiv:2005.05960v2, Jun. 30, 2020.
Akinola et al.; Dynamic Grasping with Reachability and Motion Awareness; IROS; arXiv:2103.10562v1, Mar. 18, 2021.
Battaglia et al.; Interaction Networks for Learning about Objects, Relations and Physics; arXiv:1612.00222v1, Dec. 1, 2016.
Battaglia et al.; Relational Inductive Biases, Deep Learning, and Graph Networks; arXiv:1806.01261v3, Oct. 17, 2018.
Chung et al.; A Recurrent Latent Variable Model for Sequential Data; arXiv:1506.02216v6, Apr. 6, 2016.
Errica et al.; Graph Mixture Density Networks; arXiv:2012.03085v3, Jun. 25, 2021.
Girdhar et al.; Forward Prediction for Physical Reasoning; arXiv:2006.10734v2, Mar. 29, 2021.
Han et al.; Predicting Physics in Mesh-reduced Space with Temporal Attention; arXiv:2201.09113v4, May 26, 2022.
Pathak et al.; Curiosity-driven Exploration by Self-supervised Prediction; 34th International Conference on Machine Learning, Sydney, Australia; arXiv:1705.05363v1, May 15, 2017.
Pertsch et al.; Keyframing the Future: Keyframe Discovery for Visual Prediction and Planning; arXiv:1904.05869v2, May 8, 2020.
Qi et al.; Learning Long-term Visual Dynamics with Region Proposal Interaction Networks; arXiv:2008.02265v5, Apr. 2, 2021.
Sanchez-Gonzalez et al.; Learning to Simulate Complex Physics with Graph Networks; arXiv:2002.09405v2; Sep. 14, 2020.
Wu et al.; Modeling Trajectories with Recurrent Neural Networks, Proceedings of the Twenty-Sixth International Joint Conference on Artificial Intelligence; Aug. 19, 2017.
Wu et al.; GraspARL: Dynamic Grasping via Adversarial Reinforcement Learning; arXiv:2203.02119v2, Mar. 14, 2022.
Zhao et al.; Point Transformer; arXiv:2012.09164v2, Sep. 26, 2021.

* cited by examiner

600

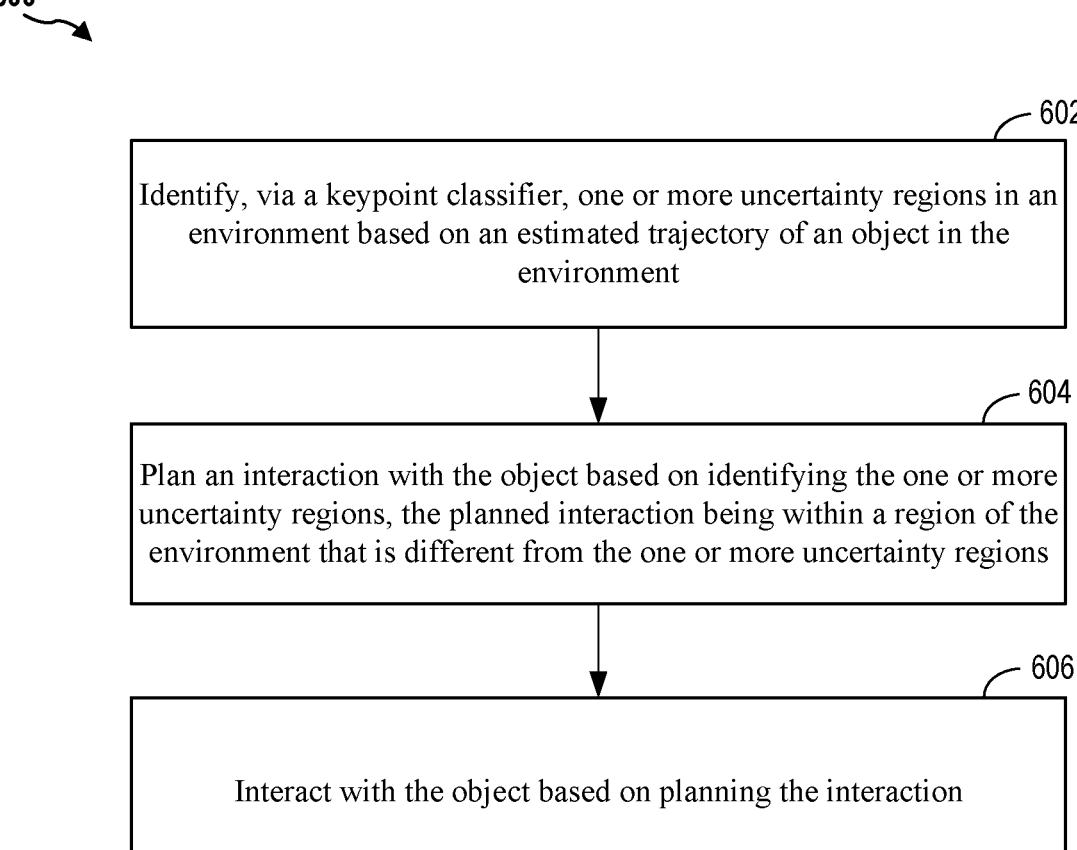

602

Identify, via a keypoint classifier, one or more uncertainty regions in an environment based on an estimated trajectory of an object in the environment

604

Plan an interaction with the object based on identifying the one or more uncertainty regions, the planned interaction being within a region of the environment that is different from the one or more uncertainty regions

606

Interact with the object based on planning the interaction

*FIG. 6*

ESTIMATING A TRAJECTORY OF AN OBJECT IN AN ENVIRONMENT

CROSS-REFERENCE TO RELATED APPLICATION

The present application claims the benefit of U.S. Provisional Patent Application No. 63/445,216, filed on Feb. 13, 2023, and titled "Estimating a trajectory of an object in an environment," the disclosure of which is expressly incorporated by reference in its entirety.

FIELD OF THE DISCLOSURE

Certain aspects of the present disclosure generally relate to motion estimation, and more specifically to systems and methods for estimating a motion of an object in a real-world environment.

BACKGROUND

Autonomous agents (e.g., vehicles, robots, etc.) rely on machine vision for constructing a three-dimensional (3D) representation of a surrounding environment. The representation may be used for various tasks, such as localization and/or autonomous navigation. In some examples, the 3D representation may be used to estimate (e.g., predict) a motion of an object. An agent, such as an autonomous agent, may perform one or more tasks, such as catching the object or grasping the object, based on the estimated motion.

SUMMARY

In one aspect of the present disclosure, a method for interacting with an object includes identifying, via a keypoint classifier, one or more uncertainty regions in an environment based on an estimated trajectory of an object in the environment. The method further includes planning an interaction with the object based on identifying the one or more uncertainty regions, the planned interaction being within a region of the environment that is different from the one or more uncertainty regions. The method also includes interacting with the object based on planning the interaction.

Another aspect of the present disclosure is directed to an apparatus including means for identifying, via a keypoint classifier, one or more uncertainty regions in an environment based on an estimated trajectory of an object in the environment. The apparatus further includes means for planning an interaction with the object based on identifying the one or more uncertainty regions, the planned interaction being within a region of the environment that is different from the one or more uncertainty regions. The apparatus also includes means for interacting with the object based on planning the interaction.

In another aspect of the present disclosure, a non-transitory computer-readable medium with non-transitory program code recorded thereon is disclosed. The program code is executed by one or more processors and includes program code to identify, via a keypoint classifier, one or more uncertainty regions in an environment based on an estimated trajectory of an object in the environment. The program code further includes program code to plan an interaction with the object based on identifying the one or more uncertainty regions, the planned interaction being within a region of the environment that is different from the one or more uncertainty regions. The program code also includes program code to interact with the object based on planning the interaction.

Some other aspects of the present disclosure are directed to an apparatus having one or more processors, and one or more memories coupled with the one or more processors and storing instructions operable, when executed by the one or more processors, to cause the apparatus to identify, via a keypoint classifier, one or more uncertainty regions in an environment based on an estimated trajectory of an object in the environment. Execution of the instructions also cause the apparatus to plan an interaction with the object based on identifying the one or more uncertainty regions, the planned interaction being within a region of the environment that is different from the one or more uncertainty regions. Execution of the instructions also cause the apparatus to interact with the object based on planning the interaction.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 6 is a flow diagram illustrating an example process for object interaction based on motion estimation, in accordance with various aspects of the present disclosure.

DETAILED DESCRIPTION

Figure 1A:
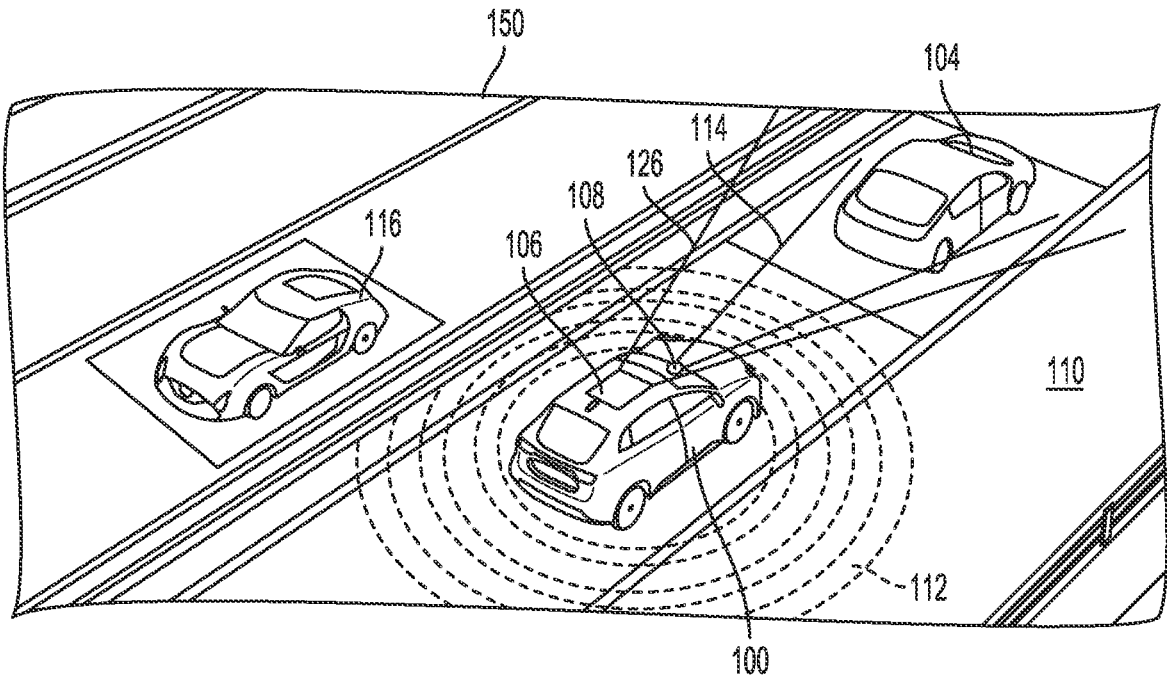
FIG. 1A is a diagram illustrating an example of a vehicle in an environment, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

The challenge of modeling the dynamics of simple objects in a physical world is that a real-world environment is stochastic. For example, the real-world environment may be subject to chance and variability. A physical environment that has unpredictable elements such as wind or water currents can be considered stochastic. Additionally, the trajectories of objects often have chaotic properties. Although parts of a motion of an object may be predictable, such as during free fall or low velocities, there are bifurcation points, such as during contact, that make it difficult to predict the motion of the object. Bifurcation points are points in a physical system where the trajectory or motion of the object becomes unpredictable and diverges due to the stochastic nature of the environment. These points can occur during events such as contact between objects or sudden changes in the environment, and they can pose a challenge for accurately predicting the motion of objects.

Conventional systems for predicting object motion in a three-dimensional (3D) environment (e.g., 3D scene) rely on deterministic models that may not account for the inherent non-determinism and uncertainty, thereby leading to inaccurate predictions. Aspects of the present disclosure are directed to improving object motion predictions in 3D scenes by accounting for uncertainty and non-determinism. Specifically, some aspects are directed to a motion prediction model that predicts a motion a dynamic object in an environment. Aspects of the present disclosure addresses the challenge of modeling the dynamics of simple objects in a stochastic environment, which may have bifurcation points that make the motion unpredictable quickly.

In some examples, the motion prediction model may be conditioned on point clouds of the scene to learn contact points that generalize across environments. The motion prediction model may be actionable and may be used for a downstream application associated with a predictive model in uncertain environments. For example the motion prediction model may be used in an application for interacting with moving objects.

In some examples, a piecewise representation of a trajectory is used to handle uncertainty from bifurcation points. The predicted trajectory is built out iteratively, observing the input at each iteration and predicting the next time-step for a bifurcation keypoint. The motion prediction model may be trained on an ensemble of forward models, each of which learns to predict different outcomes at the bifurcation point while learning to predict similar outcomes on the predictable steps. In some examples, the ensemble of forward models may be trained on different sets of the dataset to identify keypoints and measure uncertainty. The motion prediction model can be used to predict the trajectory until a given time-step, before observing the object's new location and re-conditioning all the forward predictors.

Additionally, various aspects of the present disclosure are directed to controlling an agent, such as autonomous or semi-autonomous robot, to manipulate a moving object based on predicting the object's motion. In some examples, a model (e.g., machine learning model) may be used to identify dynamic objects and interact with the dynamic objects. In some such examples, the model may be used by the agent to grasp stationary objects, as well as dynamic objects, including dynamic objects with random movements. In some examples, a prediction framework may be integrated into a loop for controlling an agent to manipulate moving objects.

Aspects of the present disclosure provide a novel approach to modeling object trajectories in physical worlds with chaotic properties and stochastic environments. Aspects of the present disclosure may be used for various applications in fields such as robotics, automation, and motion planning. Particular aspects of the subject matter described in this disclosure may be implemented to realize one or more of the following potential advantages. In some examples, the described techniques may improve of an accuracy of objection motion predictions and may also improve a precision and efficiency of agent-object interactions.

As discussed, various aspects of the present disclosure are directed to controlling an agent, such as autonomous or semi-autonomous robot. Still, aspects of the present disclosure are not limited to a robot. Aspects of the present disclosure also contemplate other types of agents, such as vehicles. That may operate in an autonomous mode, a manual mode, or a semi-autonomous mode. In the manual mode, a human manually operates (e.g., controls) the agent. In the autonomous mode, an agent control system operates the agent without human intervention. In the semi-autonomous mode, the human may operate the agent, and the agent control system may override or assist the human. For example, the agent control system may override the human to prevent a collision or to obey one or more traffic rules.

FIG. 1A is a diagram illustrating an example of a vehicle 100 in an environment 150, in accordance with various aspects of the present disclosure. In the example of FIG. 1A, the vehicle 100 may be an autonomous vehicle, a semi-autonomous vehicle, or a non-autonomous vehicle. As shown in FIG. 1A, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D red-green-blue (RGB) camera, and a LIDAR sensor 106. Other sensors, such as RADAR and/or ultrasound, are also contemplated. Additionally, or alternatively, although not shown in FIG. 1A, the vehicle 100 may include one or more additional sensors, such as a camera, a RADAR sensor, and/or a LIDAR sensor, integrated with the vehicle in one or more locations, such as within one or more storage locations (e.g., a trunk). Additionally, or alternatively, although not shown in FIG. 1A, the vehicle 100 may include one or more force measuring sensors.

In one configuration, the 2D camera 108 captures a 2D image that includes objects in the 2D camera's 108 field of view 114. The LIDAR sensor 106 may generate one or more output streams. The first output stream may include a 3D cloud point of objects in a first field of view, such as a 360° field of view 112 (e.g., bird's eye view). The second output stream may include a 3D cloud point of objects in a second field of view, such as a forward facing field of view 126.

The 2D image captured by the 2D camera includes a 2D image of the first vehicle 104, as the first vehicle 104 is in the 2D camera's 108 field of view 114. As is known to those of skill in the art, a LIDAR sensor 106 uses laser light to sense the shape, size, and position of objects in the environment 150. The LIDAR sensor 106 may vertically and horizontally scan the environment 150. In the current example, the artificial neural network (e.g., autonomous driving system) of the vehicle 100 may extract height and/or depth features from the first output stream. In some examples, an autonomous driving system of the vehicle 100 may also extract height and/or depth features from the second output stream.

The information obtained from the sensors 106, 108 may be used to evaluate a driving environment. Additionally, or alternatively, information obtained from one or more sensors that monitor objects within the vehicle 100 and/or forces generated by the vehicle 100 may be used to generate notifications when an object may be damaged based on actual, or potential, movement.

Figure 1B:
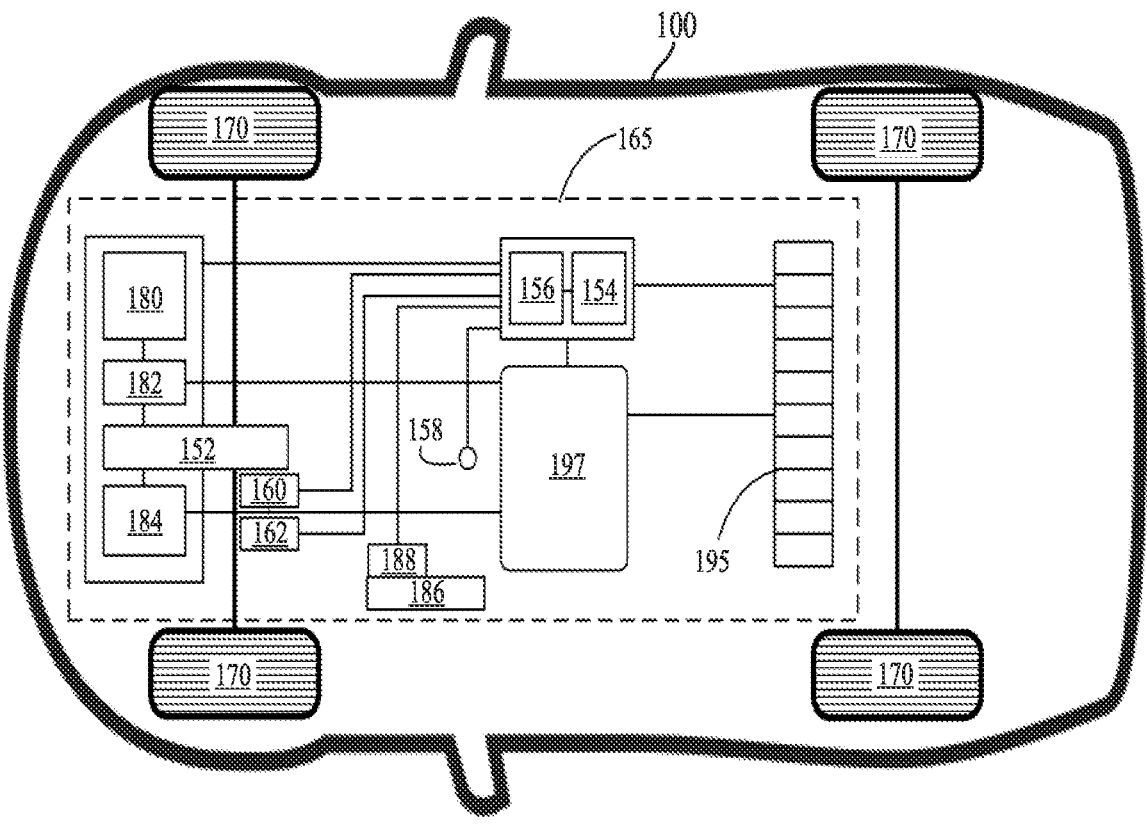
FIG. 1B is a diagram illustrating an example the vehicle, in accordance with various aspects of the present disclosure.

FIG. 1B is a diagram illustrating an example the vehicle 100, in accordance with various aspects of the present disclosure. It should be understood that various aspects of the present disclosure may be applicable to/used in various vehicles (internal combustion engine (ICE) vehicles, fully electric vehicles (EVs), etc.) that are fully or partially autonomously controlled/operated, and as noted above, even in non-vehicular contexts, such as, e.g., shipping container packing.

The vehicle 100 may include drive force unit 165 and wheels 170. The drive force unit 165 may include an engine 180, motor generators (MGs) 182 and 184, a battery 195, an inverter 197, a brake pedal 186, a brake pedal sensor 188, a transmission 152, a memory 154, an electronic control unit (ECU) 156, a shifter 158, a speed sensor 160, and an accelerometer 162.

The engine 180 primarily drives the wheels 170. The engine 180 can be an ICE that combusts fuel, such as gasoline, ethanol, diesel, biofuel, or other types of fuels which are suitable for combustion. The torque output by the engine 180 is received by the transmission 152. MGs 182 and 184 can also output torque to the transmission 152. The engine 180 and MGs 182 and 184 may be coupled through a planetary gear (not shown in FIG. 1B). The transmission 152 delivers an applied torque to one or more of the wheels 170. The torque output by engine 180 does not directly translate into the applied torque to the one or more wheels 170.

MGs 182 and 184 can serve as motors which output torque in a drive mode, and can serve as generators to recharge the battery 195 in a regeneration mode. The electric power delivered from or to MGs 182 and 184 passes through the inverter 197 to the battery 195. The brake pedal sensor 188 can detect pressure applied to brake pedal 186, which may further affect the applied torque to wheels 170. The speed sensor 160 is connected to an output shaft of transmission 152 to detect a speed input which is converted into a vehicle speed by ECU 156. The accelerometer 162 is connected to the body of vehicle 100 to detect the actual deceleration of vehicle 100, which corresponds to a deceleration torque.

The transmission 152 may be a transmission suitable for any vehicle. For example, transmission 152 can be an electronically controlled continuously variable transmission (ECVT), which is coupled to engine 180 as well as to MGs 91 and 92. Transmission 20 can deliver torque output from a combination of engine 180 and MGs 91 and 92. The ECU 156 controls the transmission 152, utilizing data stored in memory 154 to determine the applied torque delivered to the wheels 170. For example, ECU 156 may determine that at a certain vehicle speed, engine 180 should provide a fraction of the applied torque to the wheels 170 while one or both of the MGs 182 and 184 provide most of the applied torque. The ECU 156 and transmission 152 can control an engine speed (NE) of engine 180 independently of the vehicle speed (V).

The ECU 156 may include circuitry to control the above aspects of vehicle operation. Additionally, the ECU 156 may include, for example, a microcomputer that includes a one or more processing units (e.g., microprocessors), memory storage (e.g., RAM, ROM, etc.), and I/O devices. The ECU 156 may execute instructions stored in memory to control one or more electrical systems or subsystems in the vehicle. Furthermore, the ECU 156 can include one or more electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

The MGs 182 and 184 each may be a permanent magnet type synchronous motor including for example, a rotor with a permanent magnet embedded therein. The MGs 182 and 184 may each be driven by an inverter controlled by a control signal from ECU 156 so as to convert direct current (DC) power from the battery 195 to alternating current (AC) power, and supply the AC power to the MGs 182 and 184. In some examples, a first MG 182 may be driven by electric power generated by a second MG 184. It should be understood that in embodiments where MGs 182 and 184 are DC motors, no inverter is required. The inverter, in conjunction with a converter assembly may also accept power from one or more of the MGs 182 and 184 (e.g., during engine charging), convert this power from AC back to DC, and use this power to charge battery 195 (hence the name, motor generator). The ECU 156 may control the inverter, adjust driving current supplied to the first MG 182, and adjust the current received from the second MG 184 during regenerative coasting and braking.

The battery 195 may be implemented as one or more batteries or other power storage devices including, for example, lead-acid batteries, lithium ion, and nickel batteries, capacitive storage devices, and so on. The battery 195 may also be charged by one or more of the MGs 182 and 184, such as, for example, by regenerative braking or by coasting during which one or more of the MGs 182 and 184 operates as generator. Alternatively (or additionally, the battery 195 can be charged by the first MG 182, for example, when vehicle 100 is in idle (not moving/not in drive). Further still, the battery 195 may be charged by a battery charger (not shown) that receives energy from engine 180. The battery charger may be switched or otherwise controlled to engage/disengage it with battery 195. For example, an alternator or generator may be coupled directly or indirectly to a drive shaft of engine 180 to generate an electrical current as a result of the operation of engine 180. Still other embodiments contemplate the use of one or more additional motor generators to power the rear wheels of the vehicle 100 (e.g., in vehicles equipped with 4-Wheel Drive), or using two rear motor generators, each powering a rear wheel.

The battery 195 may also power other electrical or electronic systems in the vehicle 100. In some examples, the battery 195 can include, for example, one or more batteries, capacitive storage units, or other storage reservoirs suitable for storing electrical energy that can be used to power one or both of the MGs 182 and 184. When the battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2:
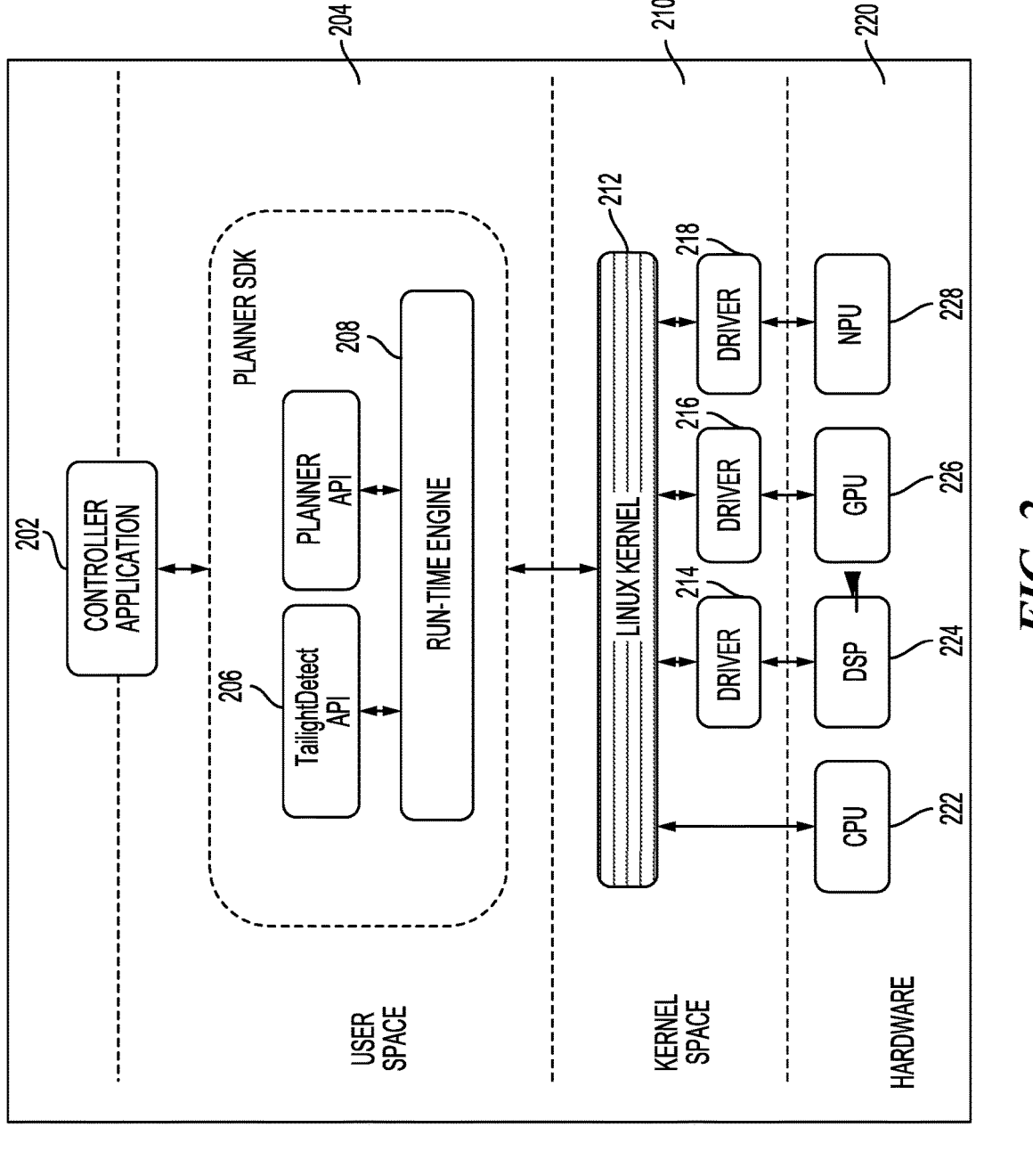
FIG. 2 is a block diagram illustrating a software architecture that may modularize artificial intelligence (AI) functions for planning and control of an autonomous agent, in accordance with various aspects of the present disclosure.

FIG. 2 is a block diagram illustrating a software architecture 200 that may modularize artificial intelligence (AI) functions for planning and control of an autonomous agent, according to aspects of the present disclosure. Using the architecture, a controller application 202 may be designed such that it may cause various processing blocks of a system-on-chip (SOC) 220 (for example a central processing unit (CPU) 222, a digital signal processor (DSP) 224, a graphics processing unit (GPU) 226 and/or an network processing unit (NPU) 228) to perform supporting computations during run-time operation of the controller application 202.

The controller application 202 may be configured to call functions defined in a user space 204 that may, for example, provide for taillight recognition of ado vehicles. The controller application 202 may make a request to compile program code associated with a library defined in a taillight prediction application programming interface (API) 206 to perform taillight recognition of an ado vehicle. This request may ultimately rely on the output of a convolutional neural network configured to focus on portions of the sequence of images critical to vehicle taillight recognition.

A run-time engine 208, which may be compiled code of a runtime framework, may be further accessible to the controller application 202. The controller application 202 may cause the run-time engine 208, for example, to take actions for controlling the autonomous agent. When an ado vehicle is detected within a predetermined distance of the autonomous agent, the run-time engine 208 may in turn send a signal to an operating system 210, such as a Linux Kernel 212, running on the SOC 220. The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
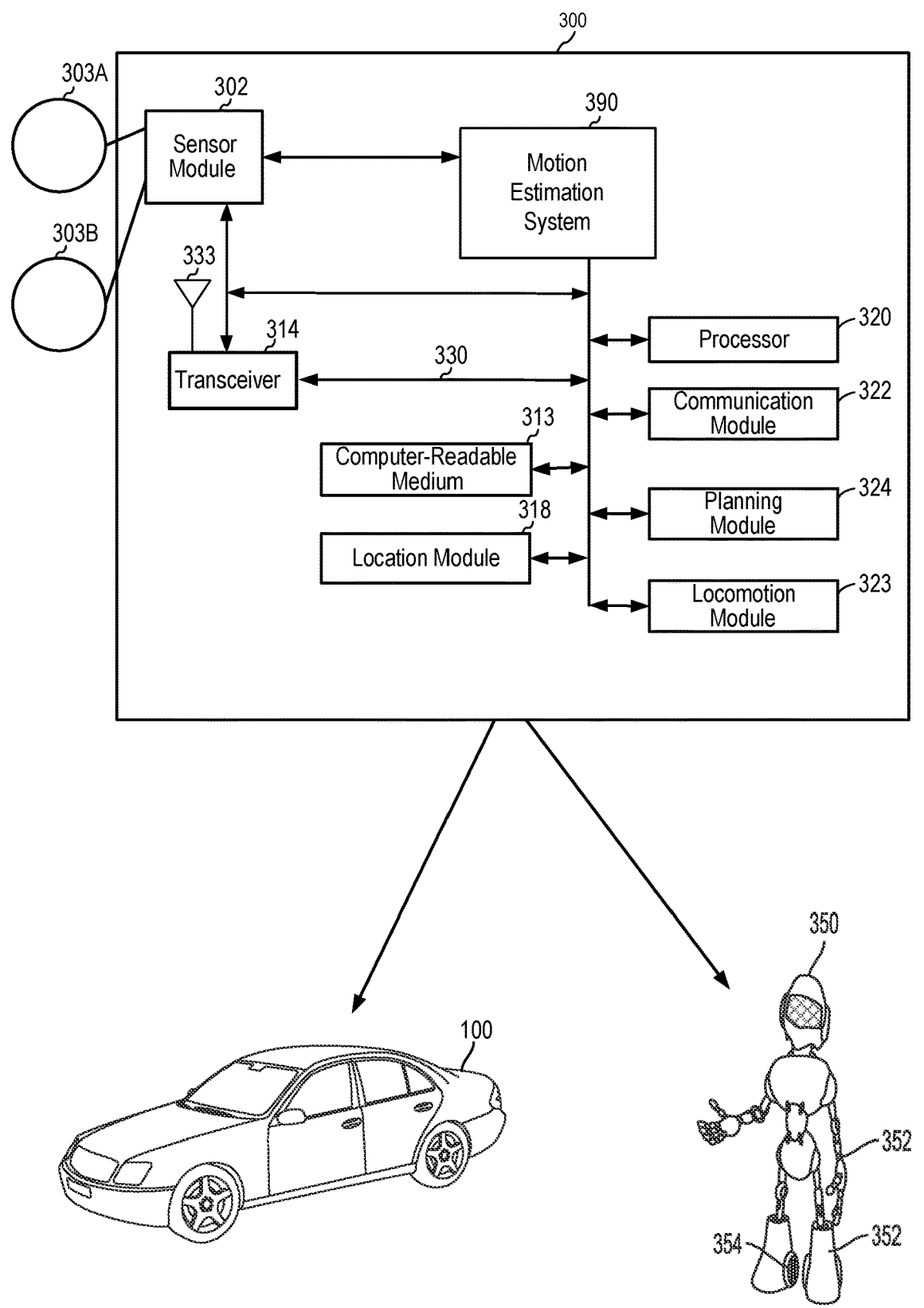
FIG. 3 is a diagram illustrating an example of a hardware implementation for a vehicle control system, in accordance with various aspects of the present disclosure.

FIG. 3 is a diagram illustrating an example of a hardware implementation for a control system 300, according to aspects of the present disclosure. The control system 300 may be a component of a vehicle 100, a robotic device 350, or other device. For example, as shown in FIG. 3, the control system 300 is a component of a vehicle 100. Aspects of the present disclosure are not limited to the control system 300 being a component of the vehicle 100, as other devices, such as a bus, boat, drone, or a robot, are also contemplated for using the control system 300. In the example of FIG. 3, the vehicle system may include a motion estimation system 390. In some examples, motion estimation system 390 is configured to perform operations, including operations of the process 600 described with reference to FIG. 6.

The control system 300 may be implemented with a bus architecture, represented generally by a bus 330. The bus 330 may include any number of interconnecting buses and bridges depending on the specific application of the control system 300 and the overall design constraints. The bus 330 links together various circuits including one or more processors and/or hardware modules, represented by a processor 320, a communication module 322, a location module 318, a sensor module 302, a locomotion module 323, a planning module 324, and a computer-readable medium 313. The bus 330 may also link various other circuits such as timing sources, peripherals, voltage regulators, and power management circuits, which are well known in the art, and therefore, will not be described any further.

The control system 300 includes a transceiver 314 coupled to the processor 320, the sensor module 302, a comfort module 308, the communication module 322, the location module 318, the locomotion module 323, the planning module 324, and the computer-readable medium 313. The transceiver 314 is coupled to an antenna 333. The transceiver 314 communicates with various other devices over a transmission medium. For example, the transceiver 314 may receive commands via transmissions from a user or a remote device. As another example, the transceiver 314 may transmit driving statistics and information from the comfort module 308 to a server (not shown).

In one or more arrangements, one or more of the modules 302, 313, 314, 318, 320, 322, 323, 324, 390, can include artificial or computational intelligence elements, such as, neural network, fuzzy logic or other machine learning algorithms. Further, in one or more arrangements, one or more of the modules 302, 313, 314, 318, 320, 322, 323, 324, 390 can be distributed among multiple modules 302, 313, 314, 318, 320, 322, 323, 324, 390 described herein. In one or more arrangements, two or more of the modules 302, 313, 314, 318, 320, 322, 323, 324, 390 of the control system 300 can be combined into a single module.

The control system 300 includes the processor 320 coupled to the computer-readable medium 313. The processor 320 performs processing, including the execution of software stored on the computer-readable medium 313 providing functionality according to the disclosure. The software, when executed by the processor 320, causes the control system 300 to perform the various functions described for a particular device, such as the vehicle 328, or any of the modules 302, 313, 314, 318, 320, 322, 323, 324, 390. The computer-readable medium 313 may also be used for storing data that is manipulated by the processor 320 when executing the software.

The sensor module 302 may be used to obtain measurements via different sensors, such as a first sensor 303A and a second sensor 303B. The first sensor 303A and/or the second sensor 303B may be a vision sensor, such as a stereoscopic camera or a red-green-blue (RGB) camera, for capturing 2D images. In some examples, one or both of the first sensor 303A or the second sensor 303B may be used to identify an intersection, a crosswalk, or another stopping location. Additionally, or alternatively, one or both of the first sensor 303A or the second sensor 303B may identify objects within a range of the vehicle 100. In some examples, one or both of the first sensor 303A or the second sensor 303B may identify a pedestrian or another object in a crosswalk. The first sensor 303A and the second sensor 303B are not limited to vision sensors as other types of sensors, such as, for example, light detection and ranging (LiDAR), a radio detection and ranging (radar), sonar, and/or lasers are also contemplated for either of the sensors 303A, 303B. The measurements of the first sensor 303A and the second sensor 303B may be processed by one or more of the processor 320, the sensor module 302, the comfort module 308, the communication module 322, the location module 318, the locomotion module 323, the planning module 324, in conjunction with the computer-readable medium 313 to implement the functionality described herein. In one configuration, the data captured by the first sensor 303A and the second sensor 303B may be transmitted to an external device via the transceiver 314. The first sensor 303A and the second sensor 303B may be coupled to the vehicle 328 or may be in communication with the vehicle 328.

Additionally, the sensor module 302 may configure the processor 320 to obtain or receive information from the one or more sensors 303A and 303B. The information may be in the form of one or more two-dimensional (2D) image(s) and may be stored in the computer-readable medium 313 as sensor data. In the case of 2D, the 2D image is, for example, an image from the one or more sensors 303A and 303B that encompasses a field-of-view about the vehicle 100 of at least a portion of the surrounding environment, sometimes referred to as a scene. That is, the image is, in one approach, generally limited to a subregion of the surrounding environment. As such, the image may be of a forward-facing (e.g., the direction of travel) 30, 90, 120-degree field-of-view (FOV), a rear/side facing FOV, or some other subregion as defined by the characteristics of the one or more sensors 303A and 303B. In further aspects, the one or more sensors 303A and 303B may be an array of two or more cameras that capture multiple images of the surrounding environment and stitch the images together to form a comprehensive 330-degree view of the surrounding environment. In other examples, the one or more images may be paired stereoscopic images captured from the one or more sensors 303A and 303B having stereoscopic capabilities.

The location module 318 may be used to determine a location of the vehicle 328. For example, the location module 318 may use a global positioning system (GPS) to determine the location of the vehicle 328. The communication module 322 may be used to facilitate communications via the transceiver 314. For example, the communication module 322 may be configured to provide communication capabilities via different wireless protocols, such as Wi-Fi, long term evolution (LTE), 3G, etc. The communication module 322 may also be used to communicate with other components of the vehicle 328 that are not modules of the control system 300. Additionally, or alternatively, the communication module 322 may be used to communicate with an occupant of the vehicle 100. Such communications may be facilitated via audio feedback from an audio system of the vehicle 100, visual feedback via a visual feedback system of the vehicle, and/or haptic feedback via a haptic feedback system of the vehicle.

The locomotion module 323 may be used to facilitate locomotion of the vehicle 328. As an example, the locomotion module 323 may control movement of the wheels. As another example, the locomotion module 323 may be in communication with a power source of the vehicle 328, such as an engine or batteries. Of course, aspects of the present disclosure are not limited to providing locomotion via wheels and are contemplated for other types of components for providing locomotion, such as propellers, treads, fins, and/or jet engines.

The control system 300 also includes the planning module 324 for planning a route or controlling the locomotion of the vehicle 328, via the locomotion module 323. A route may be planned to a passenger based on compartment data provided via the comfort module 308. In one configuration, the planning module 324 overrides the user input when the user input is expected (e.g., predicted) to cause a collision. The modules may be software modules running in the processor 320, resident/stored in the computer-readable medium 313, one or more hardware modules coupled to the processor 320, or some combination thereof. In some examples, the locomotion module 323 may control movement of the limbs 352 and/or wheels 354. As another example, the locomotion module 323 may be in communication with a power source of the robotic device 350, such as an engine or batteries.

The motion estimation system 390 may be in communication with the sensor module 302, the transceiver 314, the processor 320, the communication module 322, the location module 318, the locomotion module 323, the planning module 324, and the computer-readable medium 313. In some examples, the motion estimation system 390 may be implemented as a machine learning model. The machine learning model may incorporate the software architecture 200 described with reference to FIG. 2. Working in conjunction with one or more of the sensors 303A, 303B, the sensor module 302, and/or one or more other modules 313, 314, 318, 320, 322, 323, 324, the motion estimation system 390 may perform one or more elements of the process 600 described with reference to FIG. 6.

Modeling the dynamics of objects in real-world environments can be challenging due to the stochastic nature of the physical world. In particular, the behavior of objects can become unpredictable at bifurcation points, where the motion trajectory may change. Such bifurcation points are often encountered when objects come into contact with 3D surfaces, where the factors governing the contact physics of the object may change instantaneously and cannot be easily estimated from perception. Humans are able to intuit these bifurcation points and rapidly adapt their predictions in case of unexpected behavior. However, this is difficult for robots and other automated systems that lack the ability to perceive and reason about the physical world in the same way as humans do.

The physical world is characterized by scenarios where object motion is mostly predictable over a long period of time, but can rapidly become chaotic. Consider a ball falling into a bowl, where the motion is mainly influenced by the ballistic physics of free fall. A motion prediction system may anticipate that the ball will fall at a certain point in the bowl and make predictions about its trajectory after contact based on an understanding of the ball's contact physics. However, due to partial (e.g., incomplete) observations of the object and/or environment, such as the ball's spin or the bowl's surface irregularities, there exists a bifurcation point at the moment of contact, resulting in unpredictable motion. This unpredictability complicates prediction beyond the bifurcation point and influences potential interactions with the ball, whether it be a human or a robot. In the ball-bowl scenario, there may be a number of possible trajectories beyond the bifurcation point.

Various aspects of the present disclosure are directed to forecasting motion of an object in stochastic environments. In some examples, a motion prediction model is trained to learn features of interactions between objects and an environment to anticipate the motion of the objects in the environment as well as estimate the bifurcation points to represent uncertainty. Some physical forces, such as gravity, are not local to an environment. Still, reactive forces may be local to the environment. The motion prediction model may model the reactive force that is local. The reactive force may depend on the surface normals and curvature of nearby points in the environment. Thus allowing the motion prediction model to determine which parts of the trajectory are predictable and which parts of the trajectory are associated with bifurcation points that represent uncertainty.

Some conventional motion prediction frameworks for modeling interactions with static objects require separate representations for each new object type, and involve sampling particles based on 3D meshes. However, in real-world scenarios, scenes can be large and complex, making it challenging to model pairwise interactions between particles using locality thresholds. Additionally, determining the optimal number of message passing steps between particles to accurately model scene geometry can be difficult. To address these limitations, aspects of the present disclosure use the local nature of reactive forces, as previously discussed, and learn a single 3D embedding of the local scene to model interactions. The motion prediction model of the current disclosure is based on the notion that transformers are a type of generalized graph neural network and can be applied to sparse, shell-like point clouds, allowing the motion prediction model to scale to complex scenes without significant increases in computational or memory overhead.

When predicting uncertain outcomes, a motion prediction system may distinguish between two types of uncertainties: epistemic uncertainty, which can be reduced with more data, and aleatoric uncertainty, which is inherent to the system and cannot be further reduced. Some conventional motion prediction systems that account for aleatoric uncertainty in the training distribution of trajectories often rely on explicit prediction of trajectory distribution parameters under specific assumptions or use variational inference. Although effective in generating fully stochastic trajectories, these methods require every time-step to be modeled stochastically, which is not practical in real-world scenarios where most steps are predictable. As a result, fully variational models are vulnerable to posterior collapse. Posterior collapse refers to a phenomenon that can occur in generative models when the model's posterior distribution over latent variables fails to capture the true complexity of the data, resulting in the model ignoring the latent variables and simply fitting the data. This can lead to a model that has poor generalization performance and is overfitting to the training data. That is, the model is not able to capture the true distribution of the latent variables given the data, and instead, the model collapses to a simpler distribution.

In contrast to conventional motion prediction systems, aspects of the present disclosure address uncertainty in trajectory prediction by identifying likely times of stochastic transition through variance computation in an ensemble of deterministic forward models. In some examples, the motion prediction model may only predict until keypoints that are associated with uncertain events. In some examples, a measure of aleatoric uncertainty may be based on a disagreement between a trained ensemble of forward models. This is different from the use of disagreement to measure epistemic uncertainty in identifying under-explored regions of the space through an ensemble of single step models.

As discussed, various aspects of the present disclosure are directed to improving object motion predictions in 3D scenes by accounting for uncertainty and non-determinism.

In some examples, the object's motion is predicted using a piecewise representation of a trajectory of the object. The piecewise representation may be iteratively built. At each iteration, an input may be observed, and a next time-step is predicted for a bifurcation keypoint. The model is then rolled out until the predicted keypoint, after which the object's motion is observed again, and the process is repeated until the desired rollout length is achieved. In some examples, an ensemble of forward models may be trained on different subsets of the dataset to identify keypoints and measure uncertainty.

Additionally, various aspects of the present disclosure are directed to controlling an agent, such as an autonomous or semi-autonomous robot, to manipulate a moving object. In some examples, a prediction model (e.g., machine learning model) may be used to identify dynamic objects and interact with the dynamic objects. In some such examples, the model may be used by the agent to grasp stationary objects, as well as dynamic objects, including dynamic objects with random movements. In some examples, a prediction framework may be integrated into a loop for controlling an agent to manipulate moving objects.

Figure 4A:
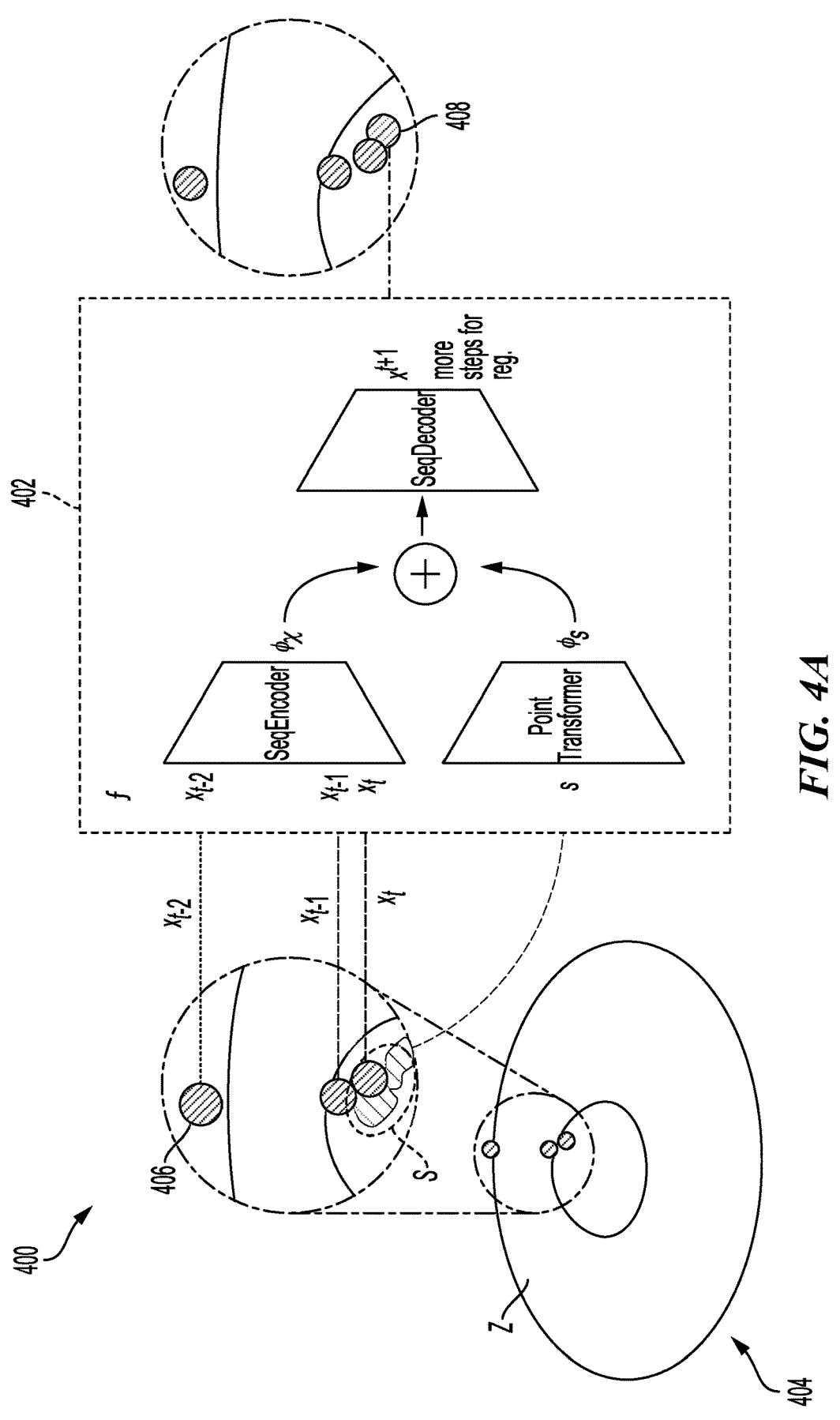
FIG. 4A is a diagram illustrating an example of training a motion prediction model, in accordance with various aspects of the present disclosure.

FIG. 4A is a diagram illustrating an example 400 of training a motion prediction model, in accordance with various aspects of the present disclosure. In the example of FIG. 4A, the motion prediction model 402 may predict a future trajectory (e.g., motion) of an object based on previous time-steps and a localized point cloud $\mathcal{Z}$ of a 3D environment 404. The 3D environment 404 may be an environment that is within a perimeter of a current location of an object. In the example of FIG. 4A, the object is a ball 406. Still, aspects of the present disclosure are not limited to predicting a future position (e.g., location) of a ball, other types of objects are contemplated.

In the example of FIG. 4A, $\{x_0, \ldots, x_t\}$ represent the observed initial conditions of the ball 406 from time-step 0 to time-step t (shown as ($x_{t-2}$, $x_{t-1}$, and $x_t$) in the example of FIG. 4A), where $x_i \in \mathbb{R}^3$ represent coordinates of the ball 406 at a discrete time-step i. That is, $x_i$ may be a 3D vector that contains a position of the ball 406 in a 3D space at a specific time-step i. $\mathbb{R}^3$ represents a 3D Euclidean space, where $\mathbb{R}$ represents a set of real numbers.

The ball 406 may traverse through the 3D environment 404 based on physical forces acting on it. The 3D environment $\mathcal{Z}$ may also be referred to as a scene or an environment. The 3D environment $\mathcal{Z}$ may be represented as a point cloud $\{z_0, \ldots, z_j\}$, where $z_j \in \mathbb{R}^3$. The point cloud is a collection of data points in 3D space where each point is defined by its 3D coordinates. The motion prediction model 402 may be trained to predict (e.g., anticipate) future positions $\{x_{t+1}, \ldots, x_T\}$.

To predict the motion of an object, such as the ball 406, in the environment 404, the motion prediction model 402 may consider forces created by the object's interaction with the surrounding surfaces. This becomes particularly challenging in environments with chaotic dynamics. In such environments, the motion prediction model 402 may be trained to reduce uncertainty by using scene geometry and ensuring that all predictions are physically plausible. To achieve accurate predictions in such scenarios, the motion prediction model 402 may be conditioned on a 3D representation of a point cloud $\mathcal{Z}$ associated with the 3D environment 404. As previously discussed, impact collisions generate forces that are determined by the surface normal and curvature at the point of impact. This results in a local property that can be used to condition the motion prediction model 402 on adjacent points in the environment 404. By doing so, aspects of the present disclosure may reduce memory and/or processor use.

In some examples, the future position 408 ($\hat{x}_{t+1}$) may be estimated as follows:

$$\hat{x}_{t+1} = f(x_{t-2}, x_{t-1}, x_t, s) \tag{1}$$

$$s = \{z_j \in \mathcal{Z} \mid \|z_j - x_t\|_2^2 < \gamma\}. \tag{2}$$

The function $f$ represents a function of the motion prediction model 402. Specifically, the function $f$ predicts the future position 408 of the ball 406 based on the ball's 406 previous positions ($x_{t-2}$, $x_{t-1}$), current position $x_t$, and the nearby points s in the environment. In Equation 2, s represents a set of points in the point cloud $\mathcal{Z}$ that are close to the ball 406 at a prior position $x_t$. A distance between each point $z_j$ and the prior position $x_t$ is within a threshold distance $\gamma \in \mathbb{R}$. That is, s represents a subset of the point cloud $\mathcal{Z}$ that contains only those points that are close enough to the last position $x_t$ of the ball 406 to be relevant for predicting its future position. If the set of points s is empty, a single learned embedding may be used for estimating the future position. When estimating at longer time horizons, the set of points s may change based on the previous estimated position of the ball 406.

In some examples, the function $f$, which estimates the future location $\hat{x}_{t+1}$ of the ball 406, may be modeled using a sequential model that accounts for the previous three time-steps ($x_{t-2}$, $x_{t-1}$, $x_t$) of the position of the ball 406 and a single 3D representation s of the critical point set. Specifically, $f$ may be defined as follows:

$$f(x_{t-2}, x_{t-1}, x_t, s) = Seq_{DEC}(\phi_x + \phi_s), \tag{3}$$

where, $Seq_{DEC}(\ )$ represents a sequential decoder (shown as SeqDecoder in FIG. 4) that receives the concatenated embeddings of the state observations $x_t$ and the local scene observations s, represented by the feature embeddings $\phi_x$ and $\phi_s$, respectively.

In some examples, prior motion embeddings sequentially aggregate to the set of initial conditions that are observed for the positions of the object, such as the ball 406. To achieve this, a sequential model may construct the feature embedding for the object's position. The embedding is denoted as $\phi_x$ and is constructed as follows:

$$\phi_x = Seq_{ENC}(x_{t-2}, x_{t-1}, x_t). \tag{4}$$

As shown in FIG. 4A, the sequential encoder ($Seq_{ENC}(\ )$) receives the previous three time-steps ($x_{t-2}$, $x_{t-1}$, $x_t$) of the ball 406. In some examples, a point transformer architecture may be used to construct the 3D scene embedding $\phi_s$. The point transformer architecture learns a representation of a point cloud by allowing each point to attend to other point locations through a special point cloud self-attention operation. The point transformer architecture is suitable for learning local geometry features such as surface normals and curvature near the last observed location $\phi_x$. Therefore, the object prediction model may receive the entire local scene s and constructs the embedding as:

$$[\phi_j]_{j=1}^{|s|} = PointTransformerBlock([z_j]_{j=1}^{|s|}) \tag{5}$$

$$\phi_s = \frac{1}{|s|} \sum_j [\phi_j], \tag{6}$$

In Equation 6, the scene embedding $\phi_s$ may be learned using self-attention, allowing each point $z_j$ in the 3D environment 404 to attend to the location of other points $z_j$. Self-attention allows the motion prediction model 402 to attend to different parts of its input sequence or set of features. By using self-attention in the point transformer architecture (shown as Point Transformer in FIG. 4A), the motion prediction model 402 can learn to weigh the importance of each point $z_j$ based on its relationship to the other points $z_j$ in the 3D environment 404. That is, each point $z_j$ can attend to other points $z_j$ and learn to incorporate their features into the representation of the 3D environment 404. This approach enables the motion prediction model 402 to learn robust local geometry features, such as surface normals and curvature.

In some examples, the motion prediction model 402 may be trained using a training distribution p(x, $\mathcal{Z}$) of pairs of trajectories x and scenes $\mathcal{Z}$. The trajectory is divided into input sequences ($x_1$, $x_{t-1}$, . . . , $x_{t-l}$) and target sequences ($x_{t+1}$, $x_{t+2}$, . . . , $x_{t+m}$). The input sequence may consist of l past positions of the ball 406. In some examples, l=3, such that the input sequence is limited to three past positions. The target sequence consists of m future positions of the ball 406. In some examples, m=2, such that the target sequence is limited to two future positions. The motion prediction model 402 learns to predict future positions based on the input sequence and the scene point cloud $\mathcal{Z}$. An $\ell_1$ loss may be used as the loss function for training the motion prediction model 402. The loss function determines the absolute difference between the predicted position $\hat{x}_t$ and the ground truth position $x_t$ for each time step t, summed over the entire trajectory. The objective of the training process is to minimize the expected value of this loss function over the training distribution p(x, $\mathcal{Z}$), which involves optimizing the neural network parameters $\theta$. The loss function may be defined as:

$$\min_{\Theta} \mathbb{E}_{(x,\mathcal{Z}) \sim p(x,\mathcal{Z})} \left[ \frac{1}{|x|} \sum_t \|\hat{x}_t - x_t\|_1 \right] \tag{7}$$

In some examples, an agent may use the prediction framework to interact a dynamic object (e.g., a moving object). Such interactions are associated with inherent difficulties based on the need for time-intensive planning and execution of actions. In conventional systems, this leads to a situation where the object of interest may have changed position by the time the agent, for example, the robot's arm, reaches its target location. To address this issue, aspects of the present disclosure propose an integrated approach that incorporates a predictive model for forecasting the future location of the object. This allows for proactive planning by considering the anticipated state of the workspace, thereby improving the system's overall efficiency. Furthermore, the predictive model incorporates the uncertainty inherent in predicting the future motion of objects, enabling the prediction framework to function in environments characterized by stochastic (e.g., random) object motion.

Figure 4B:
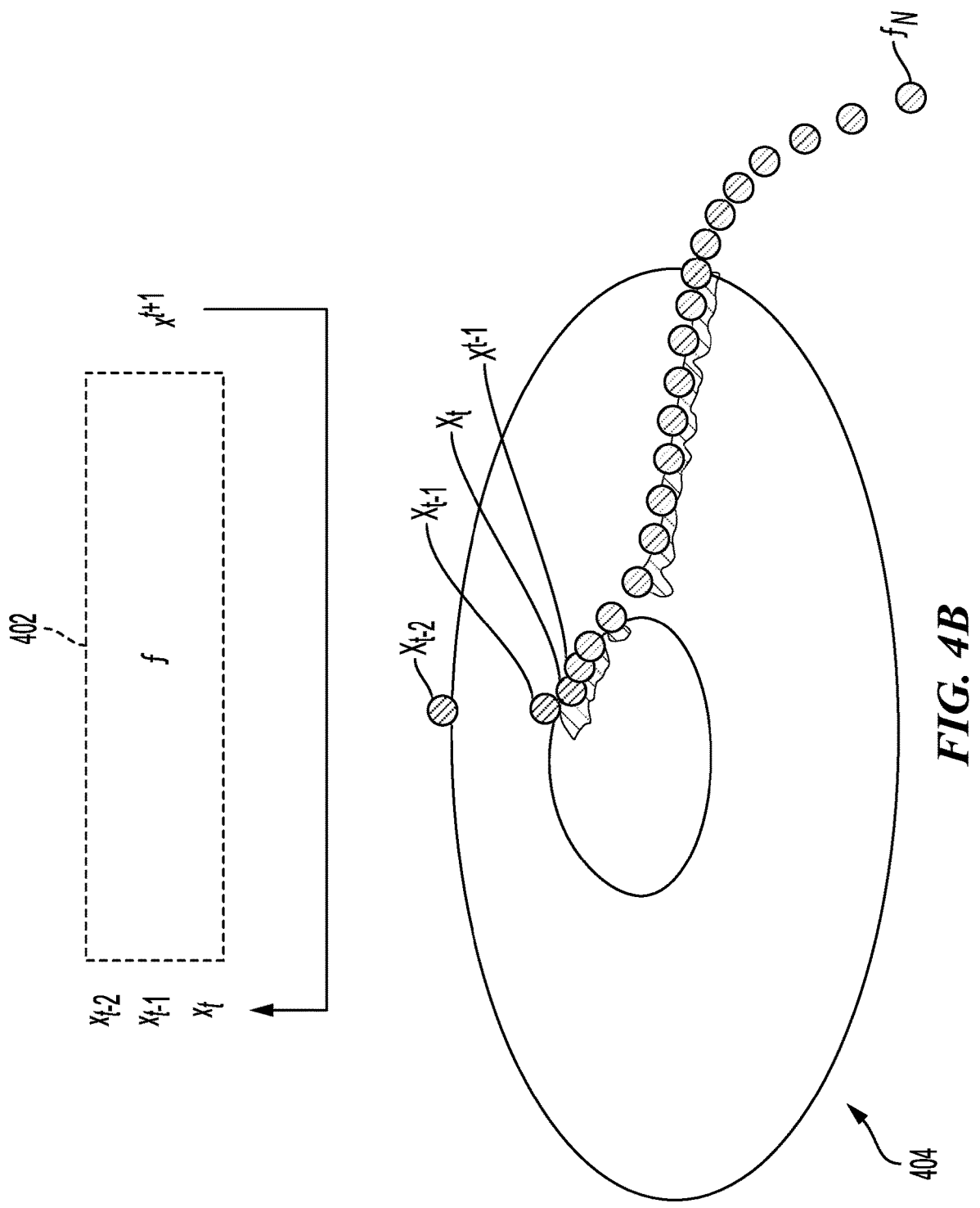
FIG. 4B is a diagram illustrating an example of predicting an object's trajectory for a future time horizon, in accordance with aspects of the present disclosure.

The motion prediction model 402 is not limited to predicting a finite number of steps. In some examples, the motion prediction model 402 may be used to forecast the object's trajectory at any future time horizon. FIG. 4B is a diagram illustrating an example of predicting an object's trajectory for a future time horizon, in accordance with aspects of the present disclosure. As discussed with reference to FIG. 4A, the motion prediction model 402 may observe previous positions $(x_{t-2}, x_{t-1})$ and a current position $x_t$ of a ball 406.

In some examples, the object's (e.g., ball's 406) trajectory at any future time horizon may be predicted achieved by recursively applying the model 402 to its own predictions:

$$\hat{x}'_{t+2} = f_2(x_{t-1}, x_t, \hat{x}_{t+1}, s^*) \tag{8}$$

$$s^* = \left\{ z_j \in \mathcal{Z} \mid \|z_j - \hat{x}_{t+1}\|_2^2 < \gamma \right\}$$

In Equation 8, where $\hat{x}_{t+1}$ is the future trajectory from a previous application of motion prediction model 402 (f). $f_N$ may indicate a number of time steps ahead that the recursive application of the model 402 may predict. In the example of Equation 8, N=2, therefore, the recursive application of the prediction model may be used to predict two future time steps $\hat{x}_{t+2}$ and $\hat{x}_{t+3}$, beyond the current predicted future time step $\hat{x}_{t+1}$. s* represents a set of points in the 3D environment 404 that are within a distance from the predicted future position $\hat{x}_{t+1}$. Specifically, s* is defined as the set of points $z_j$ in the point cloud $\mathcal{Z}$ that satisfy the condition $\|z_j - \hat{x}_{t+1}\|_2^2 < \gamma$, where $\gamma$ represents a threshold value. This set of points s* may be used to condition the predictive model 402 and improve the accuracy of the predictions of the predictive model 402.

During the rollout of our predictive model, the set of points s* that are condition may change as the predicted position $\hat{x}_{t+1}$ changes. This can lead to challenges if the threshold $\gamma$ used to select the local point clouds is kept constant during both training and inference. To address this issue, an adaptive threshold (AT) may be used during inference. When the conditioned scene set s is empty at time-step t, the model 402 searches for the presence of the point cloud along the line joining the last input position $x_t$ and the first predicted position $\hat{x}_{t+1}$. This line segment may be denoted as $\vec{l}$. In some examples, $s_{new}$ may be computed as the set of points in a point cloud $\mathcal{Z}$ whose distance from $\vec{l}$ is less than the threshold $\gamma$. Specifically, $s_{new}$ may be computed as follows:

$$s_{new} = \left\{ z_j \in \mathcal{Z} \mid d\left(z_j, \vec{l}\right) < \gamma \right\} \tag{9}$$

In Equation 9, d measures the distance from the line segment $\vec{l}$ to a point $z_j$. If $s_{new}$ is also empty, the previous prediction $\hat{x}_{t+1}$ may be retained, and the model 402 continues with the rollout. However, if $s_{new}$ is non-empty, the model 402 recomputes the estimate for $\hat{x}_{t+1}$ by conditioning on $s_{new}$ before proceeding with the rollout. This method ensures that the predicted rollout respects scene geometry and avoids surface penetration.

FIGS. 4A and 4B describe examples of a deterministic motion prediction model 402 to predict object motion in 3D scenes. In other examples, scenes with partial observation often contain non-deterministic elements, leading to bifurcation points even within physical systems. In these chaotic systems, small variations in initial conditions can cause significant changes to the particle's trajectory over the long term. This raises the question of how to approach predictability in such systems.

In some examples, a deterministic 3D model, such as the motion prediction model 402, may be used for prediction. However, such a model may not be reliable in the face of bifurcation points, as it may be forced to make a single choice when many groundtruth trajectories are possible. In other examples, a full distribution of possible future trajectories may be modeled, such that the full distribution may be sampled. However, this may be challenging in the case of bifurcation points as the bifurcation points may be arbitrarily chaotic, and any single sample may deviate from the groundtruth trajectory over the long term.

In some implementations, the prediction model estimates a motion of an object based on a limited context and without relying on any specific assumptions regarding contact parameters, such as the contact plane. The prediction model may combine the capabilities of sequential neural network models with a quick tree-based planner for improved interpretability and efficiency during interactions. In some examples, a prediction framework that uses the prediction model may determine compromises between interaction success and efficiency, which may be similar to the balance between model complexity and inference speed. Additionally, the prediction framework considers potential collisions between the agent and the environment during interactions, making it suitable for monitoring the prediction models for real-time tasks.

In chaotic systems, the motion may become completely unpredictable. Therefore, in some examples, a prediction approach may only reliably predict up to a certain point. In such examples, a model in this setting may predict the system up to the next bifurcation point, where the motion becomes unpredictable, and accurately predict the motion until this keypoint. Once the keypoint has passed and one of the many possibilities for the object's motion has occurred, the model may observe a few steps of the object's motion again before predicting behavior until the next keypoint.

To handle uncertainty from bifurcation points, aspects of the present disclosure use a piecewise representation of the trajectory and iteratively build the predicted trajectory. At each iteration, the input may be observed, and the next time-step for a bifurcation keypoint may be predicted. The predictive model may be rolled out only until that keypoint. However, the object's location could have changed. Thus, the model may once again observe the object, and repeats the process until a desired rollout length is obtained.

To identify a keypoint, a well-calibrated signal of the uncertainty in the system at any given moment may be specified. An ensemble e of models may be trained to construct such a signal. The ensemble may be trained as follows:

$$e = \left[ f^1, f^2, \dots f^n \right] \tag{10}$$

The ensemble includes n forward models $f$. The forward models $f$ may be examples of the motion prediction model 402 described with reference to FIGS. 4A and 4B. Each model is trained on a mutually-exclusive set of the dataset. During testing, all models are recursively rolled out to predict the full trajectory.

Figure 4C:
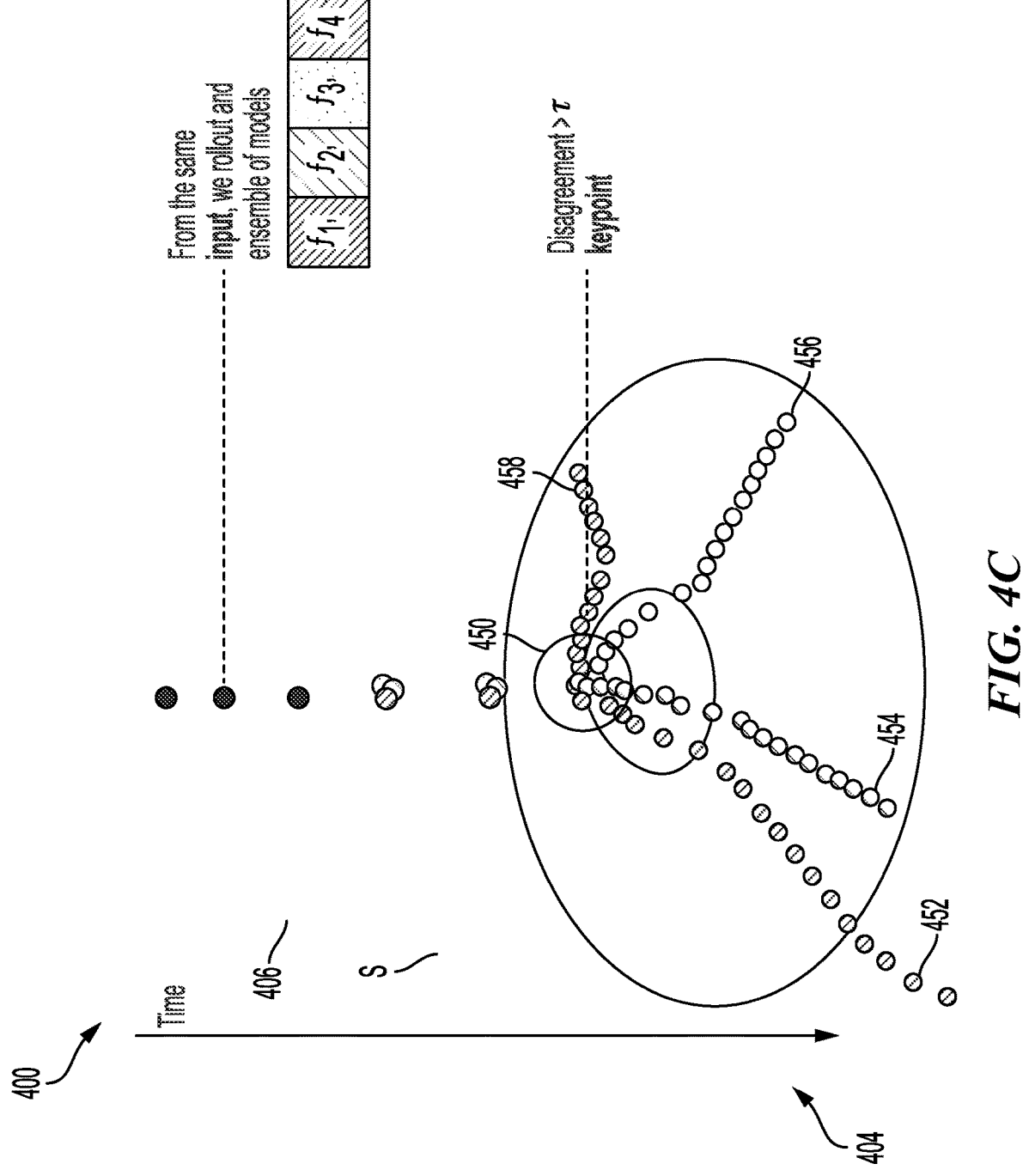
FIG. 4C is a block diagram illustrating an example of predicting different trajectories of an object via an ensemble of models, in accordance with aspects of the present disclosure.

FIG. 4C is a block diagram illustrating an example of predicting different trajectories 452, 454, 456, 458 of an object via an ensemble of models, in accordance with aspects of the present disclosure. As shown in the example of FIG. 4C, each model [$f^1$, $f^2$, . . . $f^n$] may predict a trajectory 452, 454, 456, 458. Each model may have been trained on different outcomes from the respective bifurcation points that were used to train the models. Therefore, each model learns to predict different outcomes at a bifurcation point 450 while respecting the scene geometry. Notwithstanding, each model learns to predict similar outcomes in predictable steps.

In the example of FIG. 4C, $x_{t-2}$, $x_{t-1}$, $x_t$ represent the last three observed steps of the ball 406. At every prediction step k rolled out from time-step t, a notion of the disagreement $D^{t+k}$ between the models' predictions at that time-step may be measured. The notion of the disagreement $D^{t+k}$ may be defined as:

$$D^{t+k} = \mathrm{Var}(\hat{x}_{t+k}^1, \hat{x}_{t+k}^2, \ldots \hat{x}_{t+k}^n) \qquad (11)$$

In Equation 10, $\hat{x}_{t+k}^i = f_k^i(x_{t-2}, x_{t-1}, x_t, \mathcal{Z})$, where i is an index of an ensemble model. The notion of the disagreement $D^{t+k}$ may be based on the variance $\mathrm{Var}(\ )$ of the predicted positions of all n models at that time-step t, with higher values indicating greater disagreement. This disagreement $D^{t+k}$ may be used to identify the next keypoint k* in the trajectory, which is the closest time-step in the future where the models disagree by more than a threshold τ. Specifically, the next keypoint k* may be determined as follows:

$$k^* = \arg \min_k z_k \text{ where } z_k = \begin{cases} \infty & \text{if } D^{t+k} < \tau \\ k & \text{else} \end{cases} \qquad (12)$$

Equation 12 defines a search for the next keypoint k* in the future. As shown in Equation 12, a minimum value of $z_k$ may be determined. If the disagreement between the models' predictions (measured by the variance) at time-step t+k, denoted as $D^{t+k}$, is less than a certain threshold τ, then $z_k$ is infinity, implying that the current time-step does not qualify as a keypoint. Otherwise, if the disagreement $D^{t+k}$ is greater than or equal to the threshold τ, then $z_k$ is equal to k, indicating that time-step t+k is the next keypoint. In other words, Equation 12 searches for the next time-step where the models' predictions begin to diverge significantly, indicating the presence of a bifurcation point, which is defined as the next keypoint.

The trained ensemble e of models may be used to predict the trajectory until the time-step t' which is equal to a sum of the time-step t and the identified keypoint k*(t'=t+k*). The model may then observe the object's position at times $x_{t'}$, $x_{t'+1}$, $x_{t'+2}$ and so on, and conditions all the forward predictors again.

In some examples, an agent may use the prediction framework to interact with a dynamic object (e.g., a moving object). Such interactions are associated with inherent difficulties based on the need for time-intensive planning and execution of actions. In conventional systems, this leads to a situation where the object of interest may have changed position by the time the agent, for example, the robot's arm, reaches its target location. To address this issue, aspects of the present disclosure propose an integrated approach that incorporates a predictive model for forecasting the future location of the object. This allows for proactive planning by considering the anticipated state of the workspace, thereby improving the system's overall efficiency. Furthermore, the predictive model incorporates the uncertainty inherent in predicting the future motion of objects, enabling the prediction framework to function in environments characterized by stochastic (e.g., random) object motion.

Figure 5:
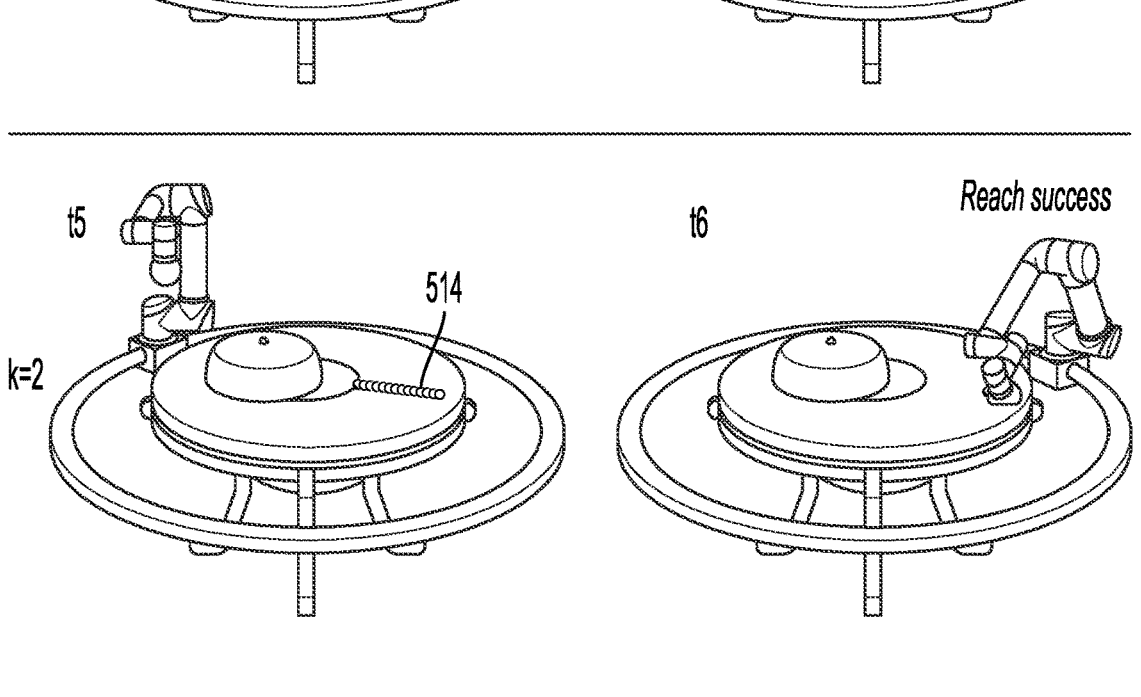
FIG. 5 is a diagram illustrating an example of a robotic device that may be tasked with reaching and making contact with a dynamic object, in accordance with aspects of the present disclosure.

FIG. 5 is a diagram illustrating an example of a robotic device 500 that may be tasked with reaching and making contact with a dynamic object. As shown in the example of FIG. 5, the robotic device 500 is provided with three observations, at times t1, t3, and t5, of a moving object at fixed intervals. The robotic device 500 may predict a motion of the object until the next bifurcation point using a forward prediction model, such as the model 402 described with reference to FIGS. 4A, 4B, and 4C. The robotic device 500 may plan its movements ahead of time to account for the time required to move from its rest location to the predicted location. The planning process takes place in an observe-predict-plan-act loop, where the robotic device 500 plans to move to the predicted location using a planner that uses step-wise inverse kinematics in its extension function. This approach allows for a highly interpretable policy, where the robotic device 500 plans its movements based on the predicted trajectory of the object. The task is designed to mimic the way in which humans interact with moving objects, such as playing a sport like tennis, where a player conditions their action on the first few observations of the ball and then adjusts their movement based on the ball's behavior.

As shown in the example of FIG. 5, at time t1, the model may predict the trajectory 502 of the falling object 504 towards the table 506 and identifies the hat 508 as a bifurcation point 510, stopping the prediction at that point. At time t2, as the object falls too quickly, the robotic device 500 is unable to reach it in time and waits for more information to become available. At time t3, upon observing the object's direction 512 after the bifurcation, the model again predicts a motion 514 of the object 504. However, a planning error may cause the robotic device 500 to fail in its attempt to reach the object 504 at time t4. At time t5, the model receives more information after the second bifurcation point. Thus, at time t6, the robotic device 500 successfully reaches the object 504 before it falls off the table 506.

As discussed, various aspects of the present disclosure are directed to a prediction framework that identifies key points in a trajectory that correspond to stochastic events, such as the bouncing of a ball off of an object. Interactions, such as grasping, are carried out only at subsets of the trajectory that exhibit deterministic behavior. The prediction model may leverage the concept of aleatoric uncertainty, which encompasses the inherent uncertainty in the model that reflects the stochastic nature of the problem. To achieve this, an ensemble of trajectory prediction models may be trained, and points of disagreement among the models are identified. For instance, with reference to the example of the ball, it is indeterminate to predict the direction of the ball after the bounce with certainty. Consequently, different models may predict inconsistent trajectories in this region.

Subsequently, the prediction framework may identify regions of uncertainty, which may be used to train a keypoint classifier. The keypoint classifier is an example of a model that inputs a trajectory and predicts the likelihood of each step resulting in stochastic behavior. In some examples, a separate model is trained for each environment, effectively committing to memory the regions that are prone to unpredictable object motion. In a more generalized version of the approach, the model also takes as input a point cloud representation of the environment and is capable of predicting regions of uncertainty in previously unseen environments during evaluation. The keypoint classifier may be used in conjunction with a grasping function. In some examples, the grasping function uses the keypoint classifier to identify regions of uncertainty, then the grasping function plans actions, such as object grasping, that are probable to be successful. In other words, the planned actions exclude regions of unpredictable object motion, such as the region where the ball bounces off an object.

FIG. 6 is a flow diagram illustrating an example process 600 for object interaction based on motion estimation, in accordance with various aspects of the present disclosure. The process 600 may be performed by a vehicle, such as a vehicle 100 as described with reference to FIGS. 1A and 1B, a robotic device, such as the robotic device 350 and 500 described with reference to FIGS. 3 and 5, or another type of device. The example process 600 is an example of object interaction based on motion estimation. As shown in the example of FIG. 6, the process 600 begins at block 602 by identifying, via a keypoint classifier, one or more uncertainty regions in an environment based on an estimated trajectory of an object in the environment. In some examples, the process 600 also predicts, via each trajectory prediction model of a group of trajectory prediction models, a trajectory of an object. The process 600 may also identify each point where the respective trajectories of the group of trajectory prediction models differ, wherein each point corresponds to a respective uncertainty region of the one or more uncertainty regions. A keypoint classifier may be trained to identify the one or more uncertainty regions based on each point where the respective trajectories of the group of trajectory prediction models differ In some examples, the process 600 receives a point cloud representation of the environment, and learns to identify the one or more uncertainty regions based on the point cloud representation. The environment may be unseen to the keypoint classifier prior to identifying the one or more uncertainty regions At block 604, the process 600 plans an interaction with the object based on identifying the one or more uncertainty regions, the planned interaction being within a region of the environment that is different from the one or more uncertainty regions. In some examples, the process 600 estimates a trajectory of the object between neighboring uncertainty regions of the one or more uncertainty regions. In some such examples, the trajectory is recursively estimated.

At block 606, the process 600 interacts with the object based on planning the interaction. In some examples, interacting with the object includes grasping the object. In some such examples, the process 600 is performed by an autonomous or semi-autonomous agent that interacts with the object.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for interacting with an object, comprising:
   estimating, via a group of trajectory prediction models, a group of trajectories of the object, each trajectory of the group of trajectories being predicted via a respective trajectory prediction model of the group of trajectory prediction models, the group of trajectories sharing a same trajectory until reaching a bifurcation point where one or more trajectories of group of trajectories diverges to a different outcome from other trajectories of the group of trajectories;
   identifying, via a keypoint classifier, one or more uncertainty regions in an environment based on estimating the group of trajectories, each of the one or more uncertainty regions being at the bifurcation point or after the bifurcation point;
   planning an interaction with the object based on identifying the one or more uncertainty regions, the planned interaction being within a region of the environment that is different from the one or more uncertainty regions; and
   interacting with the object based on planning the interaction.

2. The method of claim 1, wherein interacting with the object includes grasping the object.

3. The method of claim 1, wherein an autonomous or semi-autonomous agent interacts with the object.

4. The method of claim 1, further comprising training the keypoint classifier to identify the one or more uncertainty regions based on each point where the respective trajectories of the group of trajectory prediction models differ.

5. The method of claim 1, further comprising:
   receiving a point cloud representation of the environment; and
   learning to identify the one or more uncertainty regions based on the point cloud representation.

6. The method of claim 5, wherein the environment was unseen to the keypoint classifier prior to identifying the one or more uncertainty regions.

7. The method of claim 1, further comprising estimating a trajectory of the object between neighboring uncertainty regions of the one or more uncertainty regions.

8. The method of claim 7, wherein the trajectory is recursively estimated.

9. An apparatus for interacting with an object, comprising: one or more processors; and
   one or more memories coupled with the one or more processors and storing instructions operable, when executed by the processor, to cause the apparatus to:
      estimate, via a group of trajectory prediction models, a group of trajectories of the object, each trajectory of the group of trajectories being predicted via a respective trajectory prediction model of the group of trajectory prediction models, the group of trajectories sharing a same trajectory until reaching a bifurcation point where one or more trajectories of group of trajectories diverges to a different outcome from other trajectories of the group of trajectories;
      identify, via a keypoint classifier, one or more uncertainty regions in an environment based on estimating the group of trajectories, each of the one or more uncertainty regions being at the bifurcation point or after the bifurcation point;
      plan an interaction with the object based on identifying the one or more uncertainty regions, the planned interaction being within a region of the environment that is different from the one or more uncertainty regions; and
      interact with the object based on planning the interaction.

10. The apparatus of claim 9, wherein interacting with the object includes grasping the object.

11. The apparatus of claim 9, wherein an autonomous or semi-autonomous agent interacts with the object.

12. The apparatus of claim 9, wherein execution of the instructions further cause the apparatus to train the keypoint classifier to identify the one or more uncertainty regions based on each point where the respective trajectories of the group of trajectory prediction models differ.

13. The apparatus of claim 9, wherein execution of the instructions further cause the apparatus to:
   receive a point cloud representation of the environment; and learn to identify the one or more uncertainty regions based on the point cloud representation.

14. The apparatus of claim 13, wherein the environment was unseen to the keypoint classifier prior to identifying the one or more uncertainty regions.

15. The apparatus of claim 9, wherein execution of the instructions further cause the apparatus to estimate a trajectory of the object between neighboring uncertainty regions of the one or more uncertainty regions.

16. The apparatus of claim 15, wherein the trajectory is recursively estimated.

17. A non-transitory computer-readable medium having program code recorded thereon for interacting with an object, the program code executed by one or more processors and comprising:
   program code to estimate, via a group of trajectory prediction models, a group of trajectories of the object, each trajectory of the group of trajectories being predicted via a respective trajectory prediction model of the group of trajectory prediction models, the group of trajectories sharing a same trajectory until reaching a bifurcation point where one or more trajectories of group of trajectories diverges to a different outcome from other trajectories of the group of trajectories;
   program code to identify, via a keypoint classifier, one or more uncertainty regions in an environment based on estimating the group of trajectories, each of the one or more uncertainty regions being at the bifurcation point or after the bifurcation point;
   program code to plan an interaction with the object based on identifying the one or more uncertainty regions, the planned interaction being within a region of the environment that is different from the one or more uncertainty regions; and
   program code to interact with the object based on planning the interaction.

18. The non-transitory computer-readable medium of claim 17, wherein interacting with the object includes grasping the object.

19. The non-transitory computer-readable medium of claim 17, wherein an autonomous or semi-autonomous agent interacts with the object.

20. The non-transitory computer-readable medium of claim 17, wherein the program code further comprises program code to estimate a trajectory of the object between neighboring uncertainty regions of the one or more uncertainty regions.

* * * * *